United States Patent [19]

Pettke et al.

[11] Patent Number: 4,716,294

[45] Date of Patent: Dec. 29, 1987

[54] PYRODETECTOR FOR THE DETECTION OF A BODY ENTERING INTO ITS DETECTION AREA

[75] Inventors: Felix Pettke, Herzebrock; Hans Siwon, Obing; Hans Meixner, Haar, all of Fed. Rep. of Germany

[73] Assignee: Siemens Aktiengesellschaft, Berlin and Munich, Fed. Rep. of Germany

[21] Appl. No.: 897,300

[22] Filed: Aug. 18, 1986

[30] Foreign Application Priority Data

Sep. 11, 1985 [DE] Fed. Rep. of Germany ....... 3532476

[51] Int. Cl.$^4$ .......................... G08B 13/18; G01J 5/12

[52] U.S. Cl. .................................... 250/353; 250/342; 250/349

[58] Field of Search .......... 250/342, 353, 349, 338 PY

[56] References Cited

U.S. PATENT DOCUMENTS

| | | | |
|---|---|---|---|
| 4,081,680 | 3/1978 | Keller | 250/342 |
| 4,379,971 | 4/1983 | Smith et al. | 250/342 |
| 4,404,468 | 9/1983 | Kleinschmidt | 250/342 |
| 4,447,726 | 5/1984 | Mudge et al. | 250/342 |
| 4,486,661 | 12/1984 | Guscott et al. | 250/342 |
| 4,551,711 | 11/1985 | Akiyama et al. | 250/353 |
| 4,616,136 | 10/1986 | Ball et al. | 250/349 |

FOREIGN PATENT DOCUMENTS

| | | | |
|---|---|---|---|
| 0023354 | 5/1983 | European Pat. Off. . | |
| 2152372 | 5/1973 | Fed. Rep. of Germany . | |
| 2930632 | 3/1982 | Fed. Rep. of Germany . | |
| 3028252 | 3/1982 | Fed. Rep. of Germany . | |
| 57-104826 | 6/1982 | Japan | 250/353 |

OTHER PUBLICATIONS

Electronics–Jun. 16, 1982, vol. 55, No. 12, pp. 84 and 86.

Freitag et al., "Human Body Detection with the PID II Passive Infrared Detector", *Siemens Components,* 3/86, pp. 92–97.

*Primary Examiner*—Carolyn E. Fields

*Attorney, Agent, or Firm*—Hill, Van Santen, Steadman & Simpson

[57] ABSTRACT

A pyrodetector having a concave mirror containing a sensor element arranged in a focus thereof. The sensor element is on a film and is distinguished by a compact structure. The concave mirror is formed of a body having a rectangular cross-section, of a reflector part, and of sidewalls positioned perpendicularly relative to one another. An opening is provided in a reflector portion through which a retaining part provided with plug pins is inserted. The concave mirror, an evaluation means arranged outside of the concave mirror behind the reflector portion, and a honeycomb lattice and a covering are accommodated as an overall arrangement in a housing.

13 Claims, 10 Drawing Figures

PYRODETECTOR FOR THE DETECTION OF A BODY ENTERING INTO ITS DETECTION AREA

RELATED APPLICATIONS

The present application is related to the following applications: "PYRODETECTOR FOR THE DETECTION OF A BODY ENTERING INTO ITS DETECTION AREA", U.S. Ser. No. 897,316, filed Aug. 18, 1986. "SENSOR ELEMENT IN A RETAINING FRAME FOR A PYRODETECTOR AND METHOD FOR THE MANUFACTURE THEREOF", U.S. Ser. No. 898,441, filed Aug. 20, 1986.

BACKGROUND OF THE INVENTION

The invention relates to a pyrodetector for the detection of a body entering into its detection area and wherein the body has a temperature deviating from its environment. A concave mirror or concentrating reflector for focussing the heat radiation emanating from the body is provided along with a first sensor element at the focus of the concave mirror. At least one further sensor element is provided for the compensation of environmental influences. A film of uniform electrically nonconductive material, particularly polyvinylidene di-fluoride, and having an isodirectional permanent orientation polarization with electrodes situated thereon is provided for the first and further sensor elements. This arrangement is secured in a mounting also containing a cover of the mirror cavity transmissive for the incident radiation and an electronic evaluation means. The film with the sensor elements is arranged in the concave mirror such that a radiation incidence of the radiation reflected in the concave mirror is present on both surface sides of the film. The concave mirror is a parabolic mirror dimensioned such that its focus lies in the inner half of the concave mirror. Thus, the film with the sensor elements is at the optical axis of the concave mirror so that the first sensor element is essentially impinged only by a radiation of the detectable body situated at a greater distance which has been reflected in the concave mirror. A thin film of polyethylene is employed as a covering, this film being stretched over a honeycomb lattice acting as a support which is arranged preceding the mirror cavity.

A pyrodetector comprising these features has been set forth in detail with respect to its structural design and, in particular, with respect to its functioning in EP-E1 U.S. Pat. No. 0,023,354. This European patent corresponds to German Pat. No. 29 30 632 together with German OS Pat. No. 30 28 252, as well as to U.S. Pat. No. 4,404,468, incorporated herein by reference.

A preferred embodiment of the thin film of polyethylene serving as a covering is set forth in the German patent application P 35 32 475.9.

A particularly preferred structural design for the arrangement of the sensor elements in a retaining frame and a method for the manufacture thereof are set forth in the German patent application P 35 32 454.6.

SUMMARY OF THE INVENTION

An object of the present invention is to specify an embodiment of the pyrodetector of the type initially cited which is particularly space-saving due to a compact design and structure, and thus can have particularly small outside dimensions.

In order to achieve this objective, according to the pyrodetector of the invention:

(a) A concave mirror formed of a member with a rectangular cross-section comprising a major axis and a minor axis, contains a reflector portion which is curved in two planes forming an arced surface, and contains side walls which are perpendicular relative to one another;

(b) The film having the sensor elements is arranged parallel to the minor axis and, together with a retaining frame carrying the film, is inserted through an opening in the reflector part of the concave mirror;

(c) Two U-shaped parts of a mount for the retaining frame of the film with the sensor elements are positioned parallel to one another from the opening into the cavity of the concave mirror;

(d) An electronic evaluation means formed of a board having printed interconnects and active and passive electrical components, is arranged outside the concave mirror and behind its reflector part, the sensor elements being connected to the evaluation means via plug pins of the retaining frame;

(e) The electronic evaluation means is held by resilient clamps provided with barbs, said clamps being secured to the outside of the concave mirror; and (f) The overall arrangement formed of the concave mirror with the sensor elements, the electronic evaluation means, and the honeycomb lattice provided with the cover film being accommodated in a housing providing shielding against disturbing influences.

The ratio between the minor axis and the major axis of the body of the concave mirror preferably lies in the range from 1:1.3 through 1:1.7.

Preferred dimensions for the minor axis are 24.0 mm, and for the major axis 36.0 mm; or 13.6 mm for the minor axis and 18 mm for the major axis. In the former case, the length of the pyrodetector is 36 mm measured from the front side established by the honeycomb lattice to the outside of the housing floor. In the second case, this length amounts to 52 mm because the evaluation means herein can be differently arranged.

The arched surface of the reflector part of the concave mirror is preferably dynamically balanced, whereby the curvature of the surface follows a parabolic function, for example the function $y^2=f(x)=22x$.

The two parts of the mount preferably project into the cavity of the concave mirror or they are integrated in the two side walls of the concave mirror which lie parallel to the major axis of the body of the concave mirror.

The printed circuit board of the electronic evaluation means preferably is perpendicular to the optical axis of the concave mirror and the plug pins of the retaining frame are secured in holes of the printed circuit board. These holes, and thus the plug pins, are electrically connected to the overall circuit via the printed interconnects.

On the other hand, it is advantageous when the printed circuit board of the electronic evaluation means is arranged in the direction of the optical axis and parallel to the major axis of the concave mirror, and when the plug pins are mechanically connected to the printed circuit board and are connected to the overall circuit via the printed interconnects.

For a better space exploitation, and in case it cannot be fashioned extremely small, the printed circuit board can preferably be arranged perpendicular to the plane of the film comprising the sensor elements.

The body of the concave mirror is preferably formed of plastic and is mirrored at least on the surface of its cavity with a metal coat which forms the reflector part.

In this case, it is advantageous to connect the resilient one piece clamps to the body of the concave mirror, i.e. that the body and the clamps are manufactured in one work step, for example by means of centrifugal casting or in a molding process.

In order to guarantee an adequate shielding against disturbing influences from the outside, at least the housing is formed of electrically conductive plastic. However, the body of the concave mirror can likewise be formed of electrically conductive plastic.

On the other hand, the housing can be formed of metal.

In the latter two instances, the shielding against disturbing influences from the outside is completed when the honeycomb lattice itself contains a metal coating at its surface, or when it is likewise formed of conductive plastic or of metal. This is set forth in detail in the European patent initially cited.

An essentially space-saving possibility for the structural design of a pyrodetector is guaranteed by means of the invention, since external dimensions which are at least five to ten times smaller in comparison to previously known pyrodetectors can be achieved.

DESCRIPTION OF THE PREFERRED EMBODIMENTS

Figure 1:
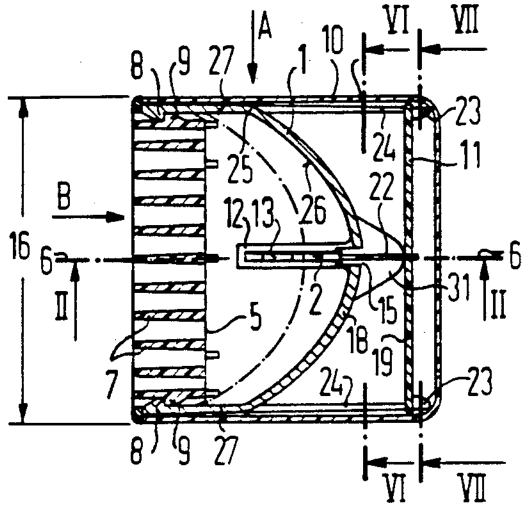
FIG. 1 is a sectional view of a pyrodetector along the line I—I of FIG. 2.

FIGS. 1–4 show that the concave mirror 1 is formed of a body 25 which has a rectangular cross-section with a major axis 16 and a minor axis 17. The concave mirror 1 contains a reflector portion 26 which is curved in two planes, thus forming an arced surface 18. The concave mirror 1 further contains side walls 27 and 28 perpendicular to one another, whereby the side walls 27 are arranged parallel to the minor axis 17, and the side walls 28 are arranged parallel to the major axis 16. At its front part (at the left in FIG. 1), the concave mirror 1 contains barbs 8 behind which the honeycomb lattice 7 is secured by means of barbs 9. A covering 5 formed of a polyethylene film is stretched over the honeycomb lattice 7.

On the optical axis 6—6, the concave mirror 1 comprises an opening 15 proceeding from which the two parts of the mounting 12 project into the cavity of the concave mirror 1. These two parts are U-shaped. A retaining frame 14 which carries the film 13 with the sensor elements 2, 3, and 4, is inserted through the opening 15.

These sensor elements 2, 3, and 4 are formed by electrodes such as set forth in detail, for example, in the previously mentioned European patent or in the previously mentioned German patent application of the same priority. The two electrodes are separated from one another by a metal-free strip 30 which proceeds in quasi-meander-like fashion. The sensor element arrangement is connected to the evaluation means 11 via lines which merge into plug pins 22 of the retaining frame 14.

The electronic evaluation means 11, as known per se in another context, is provided with a layer of, for example, polyimide, polyethyleneterephthalate, or zapon varnish for protection against environmental influences. It is held by resilient clamps 24 provided with barbs 23. Spacers 31 are provided in case the printed circuit board 19 does not lie directly against the reflector part 26. These spacers 31 as well as the resilient clamps 24 are preferably one piece with the body 25 of the concave mirror 1. In the present exemplary embodiment, the spacers 31 represent, so to speak, an extension of the side walls 28 of the body 25. The length of the spacers 31 is dimensioned such that active and passive electric components situated on the printed circuit board 19, not shown here for reasons of clarity, have adequate space between the printed circuit board 19 and the reflector part 26 when the printed interconnects are present on that side of the printed circuit board 19 facing away from the reflector part 26.

The overall arrangement of the pyrodetector comprising concave mirror 1 with the sensor elements 2, 3, 4, the electronic evaluation means 11, and the honeycomb lattice 7 provided with the cover film 5, is accommodated in a housing 10 which shields against disturbing influences. This housing 10 can be formed of metal or of metal-coated plastic, or preferably of electrically conductive plastic whereby an electrically conductive injection molded plastic on a polyamide basis can advantageously be employed as plastic, for example EP Grilamid W 5941, a polyamide 12 of Ems-Chemie AG.

Figure 3:
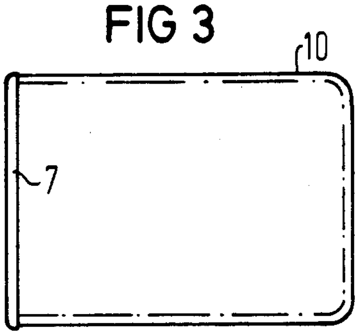
FIG. 3 is a plan view of the pyrodetector of FIG. 1 in accordance with the arrow A.

FIG. 3 shows in plan view the pyrodetector of FIG. 1 viewed in accordance with arrow A in roughly a scale of 1.5:1 to the actual size of the pyrodetector.

Figure 4:
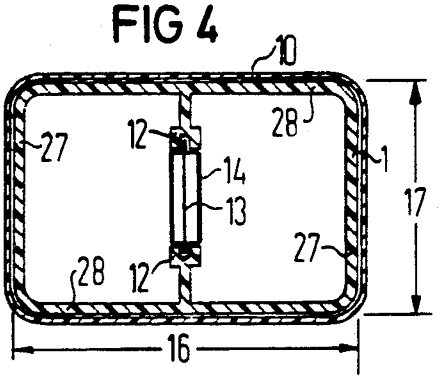
FIG. 4 is a sectional view of a pyrodetector of FIG. 2 along line IV—IV.

FIG. 4 shows that the retaining frame 14 with the film 13 carrying the sensor elements is inserted into the two U-shaped parts of the mount 12. FIG. 4 furthermore shows that the thickness of the housing 10 is relatively slight, so that the dimensions specified for the axes 16 and 17 are only slightly exceeded in the finished pyrodetector.

Figure 5:
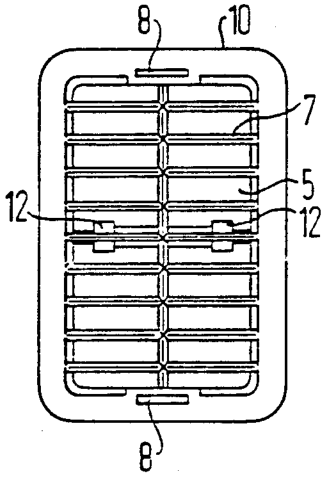
FIG. 5 is a plan view of the front section of the pyrodetector in accordance with arrow B in FIG. 1.

FIG. 5 shows a plan view of the front side of the pyrodetector in accordance with arrow B in FIG. 1. The arrangement of the honeycomb lattice 7, the two parts of the mount 12, and the barbs 8 applied to the concave mirror 1 may be seen. The cover film 5, furthermore, is situated behind the honeycomb lattice in the viewing direction.

Figure 6:
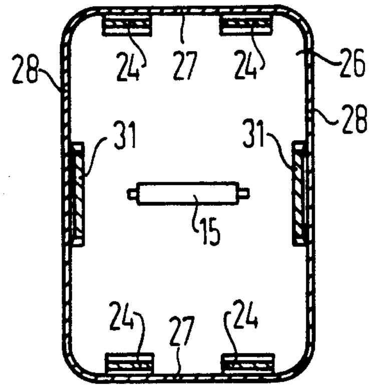
FIG. 6 is a sectional view through the pyrodetector of FIG. 1 along line VI—VI.

FIG. 6 represents a section along the lines VI—VI in FIG. 1, allows the opening 15 in the reflector part 26, the side walls 27 and 28, the resilient clamps 24, and the spacers 31 to be clearly seen with respect to their position and disposition.

Figure 7:
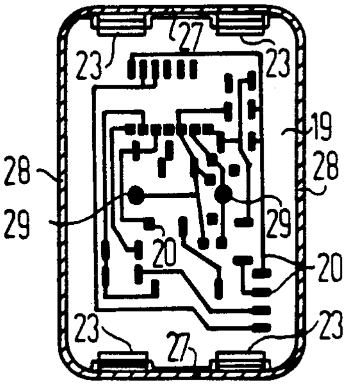
FIG. 7 is a sectional view of the pyrodetector of FIG. 1 along line VII—VII.

FIG. 7, which represents a section along the line VII—VII in FIG. 1, shows that side of the printed circuit board 19 on which the printed interconnects 20 of the evaluation means are contained. The plug pins 22 (not show here) of the retaining frame 14 project through the holes 29 and, for example, are connected to the printed interconnects 20 by means of immersion soldering. The barbs 23, which are situated at the resilient clamps 24, overlap the printed circuit board 19, for which reason recesses are shown in these edge regions. In this way, the printed circuit board and thus the overall evaluation means 11, in interaction with the spacer 31 if warranted, are very reliably held fast at the backside of the concave mirror 1.

Figure 8:
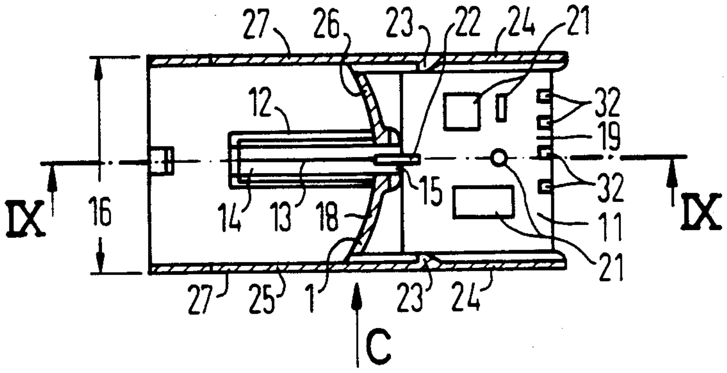
FIG. 8 is a sectional view of another embodiment of the pyrodetector along line VIII—VIII in FIG. 9.
Figure 9:
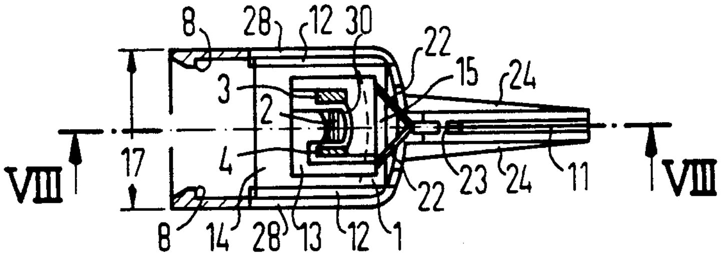
FIG. 9 is a sectional view of the pyrodetector of FIG. 8 along line IX—IX in FIG. 8.
Figure 10:
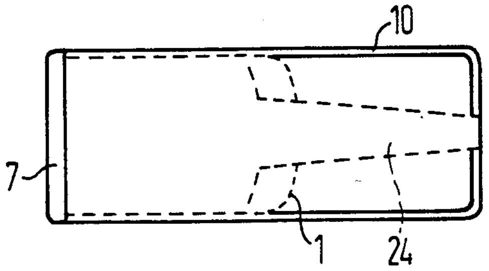
FIG. 10 is a side view of the pyrodetector of FIGS. 8 and 9 in the direction of the arrow C in FIG. 8.

FIGS. 8, 9, and 10 show another embodiment of the pyrodetector wherein the printed circuit board 19 of the evaluation means 11 is arranged in the direction of the optical axis 6—6 parallel to the major axis. Active and passive electrical components are shown at that side of the printed circuit board 19 visible in the plan view, these components guaranteeing the functioning of the evaluation means 11 by means of appropriate connection. Thus, a corresponding signal is generated from the respective detection situation, which is then forwarded to a switch to be actuated via the terminal contacts 32.

From FIG. 9, it can be seen that the two U-shaped parts of the mounting 12 are integrated in the side walls 28 which lie parallel to the major axis 16 of the body 25 of the concave mirror 1. The opening 15 comprises a width corresponding thereto which, except for the wall thicknesses, extends nearly up to the side walls 28.

Figure 2:
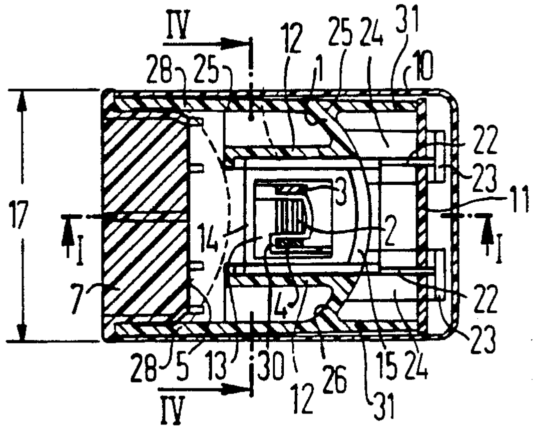
FIG. 2 is a sectional view of the pyrodetector of FIG. 1 along the line II—II.

As a result thereof, it is possible to utilize a retaining frame 14 in this pyrodetector having the sensor film 13 carrying the sensor elements 2, 3, and 4 whose dimensions practically correspond to the dimensions of a retaining frame which fits into the embodiment of FIGS. 1 and 2.

The plane of the printed circuit board 19 of the evaluation means 11 is perpendicular to the plane of the film 13, so that it is necessary to correspondingly deform the plug pins 22.

FIG. 10 shows the housing 10 with the honeycomb lattice 7 applied in front of it and, in broken lines, shows a side view of the pyrodetector in accordance with arrow C in FIG. 8.

Although various minor changes and modifications might be proposed by those skilled in the art, it will be understood that we wish to include within the claims of the patent warranted hereon all such changes and modifications as reasonably come within our contribution to the art.

We claim as our invention:

1. A pyrodetector for detection of a body entering into a detection area of the pyrodetector, said body having a temperature deviating from its environment, comprising:

a concave mirror shaped to focus heat radiation emanating from the body;

a first sensor element positioned at a focus of the concave mirror and at least one further sensor element positioned for compensation of environmental influences;

a film of uniform electrically non-conductive material having an iso-directional, permanent orientation polarization and electrodes situated thereon which are employed to form the first and further sensor elements;

the film and sensors forming an arrangement which is secured in a mounting;

a covering positioned to cover a cavity of the mirror and which is permeable to incident radiation;

an electronic evaluation means;

the film and sensor elements being arranged in the concave mirror such that radiation reflected by the concave mirror is incident on both surface sides of the film;

the concave mirror being a parabolic mirror dimensioned such that its focus lies in an inner half thereof;

the film with the sensor elements lying at an optical axis of the concave mirror so that the first sensor element is essentially impinged only by a radiation of the body which has been reflected in the concave mirror when the body is situated at a large distance relative to a size of the mirror;

the covering comprising a thin film of polyethylene which is stretched over a honeycomb lattice acting as a support and which is arranged in front of the cavity of the mirror;

said concave mirror being formed of a body having side walls perpendicular to one another and having a rectangular cross-section with a major axis and a minor axis, and a reflector portion extending inwardly from said side walls and curved in two planes forming a continuous arced surface as said concave mirror;

said film with said sensor elements being positioned in said mounting parallel to said minor axis, and an opening in said reflector portion of said concave mirror which is dimensioned to permit insertion of said film together with a retaining frame carrying said film and said mounting;

said mounting comprising two spaced apart U-shaped parts dimensioned for mounting said retaining frame, said U-shaped parts being parallel to one another from said opening into the cavity of the concave mirror;

said electronic evaluation means comprising a circuit board with printed interconnnects and active and passive electrical components, said circuit board being arranged outside of said concave mirror and behind the reflector portion thereof, and said sensor elements being connected to said evaluation means via plug pins extending from said retaining frame;

said electronic evaluation means being held by resilient clamps provided with barbs, said clamps being secured to said body rearwardly of said concave mirror; and said concave mirror, retaining frame with the film and sensor elements, the electronic evaluation means, and the honeycomb lattice provided with the cover being accommodated in a housing means for shielding against disturbing influences.

2. A pyrodetector according to claim 1 wherein a ratio between said minor axis and said major axis of said body lies in a range from 1:1.3 through 1:1.7.

3. A pyrodetector according to claim 1 wherein said arced surface of said reflector portion of said concave mirror is dynamically balanced and a curvature of said surface follows a parabolic function.

4. A pyrodetector according to claim 1 wherein both U-shaped parts of said mounting project into said cavity of said concave mirror.

5. A pyrodetector according to claim 1 wherein both of said U-shaped parts of said mounting are integrated in the side walls of said concave mirror which lie parallel to said major axis of said concave mirror.

6. A pyrodetector according to claim 1 wherein the printed circuit board of said electronic evaluation means is arranged perpendicular to said optical axis of said concave mirror, and said plug pins of said retaining frame are secured in apertures of said circuit board.

7. A pyrodetector according to claim 1 wherein said circuit board of said electronic evaluation means is arranged in a direction of said optical axis and parallel to one of said minor and major axes of said concave mirror, and said plug pins are connected to said circuit board.

8. A pyrodetector according to claim 7 wherein said circuit board is arranged perpendicular to a plane of said film having said sensor elements.

9. A pyrodetector according to claim 1 wherein said body of said concave mirror is formed of plastic and is mirrored at at least one surfaces of its cavity by a metal coat forming said reflector portion.

10. A pyrodetector according to claim 9 wherein said resilient clamps are connected as one piece to said body of said concave mirror.

11. A pyrodetector according to claim 1 wherein at least said housing is formed of electrically conductive plastic.

12. A pyrodetector according to claim 1 wherein said housing is formed of metal.

13. A pyrodetector for detection of a body entering into a detection area thereof, said body having a temperature deviating from its environment, comprising:

a concave mirror shaped to focus heat radiation emanating from the body;

a first sensor element positioned approximately at a focus of the concave mirror and at least one further sensor element positioned for compensation of environmental influences;

a film of uniform electrically non-conductive material having an iso-directional, permanent orientation polarization and electrodes situated thereon which are employed to form the first and further sensor elements;

the film and sensors forming an arrangement which is secured in a mounting;

an electronic evaluation means on a circuit board;

the film and sensor elements being arranged in the concave mirror such that radiation reflected by the concave mirror is incident on both surface sides of the film;

the film with the sensor elements lying at an optical axis of the concave mirror so that the first sensor element is essentially impinged only by a radiation of the body which has been reflected in the concave mirror when the body is situated at a large distance relative to a size of the mirror;

a lattice arranged in front of the cavity of the mirror;

said concave mirror being formed of a rectangular body with perpendicular side walls having a major axis and a minor axis, and a reflector portion extending inwardly from said side walls and which is curved in two planes so as to form a single continuous arced surface;

said film with said sensor elements being parallel to said minor axis, and an opening in said reflector portion of said concave mirror being dimensioned to permit insertion of said film together with a retaining frame carrying said film;

said circuit board being arranged outside of said concave mirror, behind the reflector portion thereof and perpendicular to said side walls, and said sensor elements being connected to said evaluation means via electrical lines extending from said retaining frame; and said concave mirror, retaining frame with the film and sensor elements, the circuit board, and the lattice being accommodated in a housing means for shielding against disturbing influences.

* * * * *